(12) United States Patent
Hao et al.

(10) Patent No.: US 8,844,001 B2
(45) Date of Patent: Sep. 23, 2014

(54) IP-BASED MOBILE DEVICE AUTHENTICATION FOR CONTENT DELIVERY

(75) Inventors: Jack Jianxiu Hao, Lexington, MA (US); Ashraf Shehata, Tampa, FL (US); Yuhui Qian, Lexington, MA (US); Okeno R. Palmer, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 158 days.

(21) Appl. No.: 13/273,631

(22) Filed: Oct. 14, 2011

(65) Prior Publication Data

US 2013/0097315 A1 Apr. 18, 2013

(51) Int. Cl.
*H04L 29/06* (2006.01)
*H04N 21/254* (2011.01)
*H04N 21/414* (2011.01)
*H04N 21/258* (2011.01)
*H04N 21/266* (2011.01)

(52) U.S. Cl.
CPC ............ *H04L 63/08* (2013.01); *H04N 21/2541* (2013.01); *H04L 63/10* (2013.01); *H04N 21/41407* (2013.01); *H04L 63/123* (2013.01); *H04N 21/25816* (2013.01); *H04N 21/26613* (2013.01)
USPC .................................................. 726/4; 726/1

(58) Field of Classification Search
CPC ............................. H04L 63/10; H04L 63/123
USPC .................. 709/225; 726/1–21; 380/200–242
See application file for complete search history.

(56) References Cited

U.S. PATENT DOCUMENTS

2007/0250912 A1* 10/2007 Rassool et al. .................... 726/4
2008/0010207 A1* 1/2008 Yanagihara et al. ............ 705/51
2009/0254960 A1* 10/2009 Yarom et al. .................. 725/115

* cited by examiner

*Primary Examiner* — Chau Le
*Assistant Examiner* — Don Zhao (57) ABSTRACT

A device may receive a first request to determine a public-facing Internet Protocol (IP) address of a mobile device. The device may transmit, in response to the first request, and to the mobile device, the public-facing IP address. The device may receive a second request, from the mobile device, to authenticate the mobile device to receive downloadable content, the second request including the public-facing IP address of the mobile device. The device may receive a third request, from the mobile device, for a license to receive a particular content item and determine whether the public-facing IP address, corresponding to the mobile device, is valid for the particular content item. The device may transmit the license to the mobile device when the public-facing IP address is determined to be valid for the particular content item, where the license includes decryption keys for the particular content item.

22 Claims, 9 Drawing Sheets

IP-BASED MOBILE DEVICE AUTHENTICATION FOR CONTENT DELIVERY

BACKGROUND

Video content (e.g., television broadcasts, pay-per-view (PPV) content, video-on-demand (VOD) content, etc.) may be delivered in several ways. For example, television channels may be broadcast to users. Traditionally, television broadcasts have been viewed on televisions sets. More recently, users have been offered the ability to view television broadcasts on other devices, such as desktop computers, portable computers, and portable communication devices.

Content owners may wish to place limits on how a user is allowed to view video content. For example, certain content may only be available to subscribers of a certain "premium" channel or other service. As another example, some subscribers may be given immediate access to certain content while other subscribers, such as those subscribing to a more basic level of service, may be required to wait a certain time period before being able to view the content. It is thus desirable for a content provider to be able to effectively determine and enforce whether a subscriber is entitled to view content based on a wide variety of possible entitlement factors.

DETAILED DESCRIPTION OF PREFERRED EMBODIMENTS

The following detailed description refers to the accompanying drawings. The same reference numbers in different drawings may identify the same or similar elements.

Systems and/or methods described herein may determine whether a subscriber is entitled to view video content delivered over an IP based network. The determination may be made based on a public-facing IP address of the subscriber.

In one example implementation, a subscriber to video content may request to view video content on a mobile device, such as a laptop, tablet computing device, or a smart phone. The mobile device may connect to a content delivery system through, for example, a home router that enables a wireless local area network connection or through a wireless local area network connection from another location. The content delivery system may identify the mobile device and a public-facing IP address of the mobile device and may make a determination of whether to allow delivery of the requested content based on the identification of the mobile device and the public-facing IP address. For example, some content providers may allow certain content to only be viewed by certain users and when the users are within a certain location. The public-facing IP address of the user's mobile device may be used as a proxy for the location of the user's mobile device.

Figure 1:
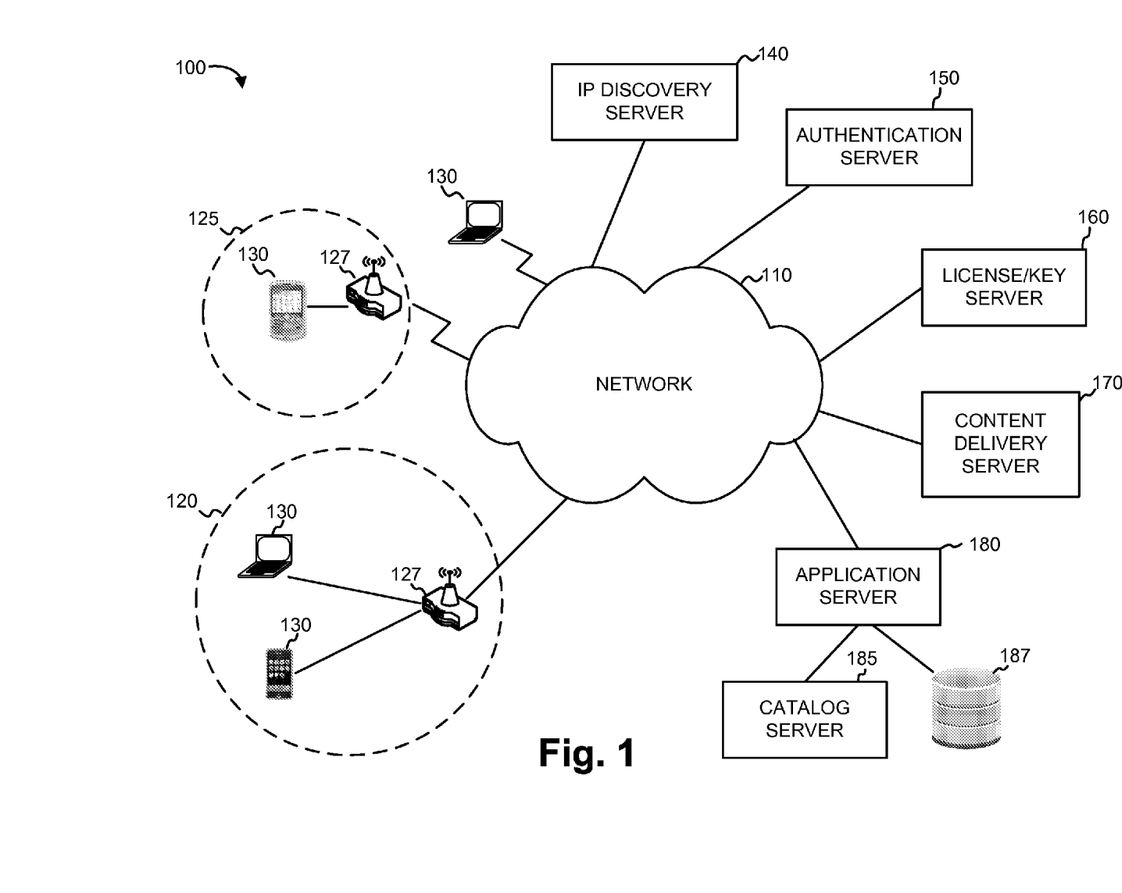
FIG. 1 is a diagram of an example environment in which systems and/or methods described herein may be implemented.

FIG. 1 is a diagram of an example environment 100 in which systems and/or methods described herein may be implemented. As illustrated, environment 100 may include a network 110, local wireless networks 120 and 125, local wireless routers 127, mobile devices 130, an IP discovery server 140, an authentication server 150, a license/key server 160, a content delivery server 170, an application server 180, a catalog server 185, and a database 187. Devices/networks of environment 100 may interconnect via one or more wired and/or wireless connections.

Network 110 may generally include a local area network (LAN), a wide area network (WAN), a metropolitan area network (MAN), a wireless network, an optical fiber or fiber optic-based network, a cable television network, a satellite television network, or a combination of networks. In one implementation, network 110, or a portion of network 110, may include a third generation (3G)/fourth generation (4G) wireless network. In some implementations, network 110 may be a private network controlled by, for example, a telecommunications company that provides television, telephone, and/or data access to local wireless networks 120/125. In another implementation, network 110 may be a public network, such as the Internet, or a combination of a public network and a private network.

Network 110 may be used to deliver content to devices, such as devices in local wireless networks 120. The content may be delivered as streaming content that may be immediately presented to a user of mobile devices 130, or as downloadable content that may be downloaded and then viewed, at a later time, by the users of mobile devices 130. In one implementation, the content may be video content. Alternatively, or additionally, other types of content, such as audio only content, may be transmitted through network 110.

Local wireless networks 120 and 125 may include a residential or business entity that is connected to network 110 and that provides local wireless access to mobile devices 130. For instance, local router 127 may be used to receive a connection, to network 110, from a telecommunications company. Local router 127 may include a WiFi router that may connect, through WiFi sessions, one or more mobile devices 130 to network 110. Local router 127 may also provide ports through which mobile devices 130 may be connected using a physical cable (e.g., a laptop computer may connect to local router 127 via an Ethernet connection). Local wireless networks 120 and 125 may correspond to, for example, a home network, a public network (e.g., a WiFi network in a shop, hospital, airport, etc.), and/or a business network.

Mobile devices 130 may include computing devices, such as a wireless telephone, a personal digital assistant (PDA), a laptop, a smart phone, a tablet computer, or another type of computation or communication device. Mobile devices 130 may connect, either directly to network 110, or indirectly through, for example, local routers 127. Users of mobile devices 130 may use mobile devices to view content that is transmitted from content delivery server 170.

Servers 140-185 may include devices that access, fetch, aggregate, process, search, provide, and/or maintain documents and/or computing services. Although shown as single components in FIG. 1, each of servers 140-185 may, in some implementations, be implemented as multiple computing devices, which may potentially be geographically distributed.

IP discovery server 140 may include one or more devices to assist in the discovery of public-facing IP addresses of mobile devices 130. A mobile device 130, in some situations, such as when connecting to network 110 through local router 127, may be assigned an IP address using network address translation (NAT). NAT may generally refer to the process of modifying IP address information in IP packet headers while the packets are in transit across local router 127. Local router 127 may be assigned, by network 110, a single public-facing IP address. Local router 127 may "hide" this IP address from mobile devices 130, which are connected to local router 127. For example, local router 127 may translate inbound packets, received from an external device and destined for a particular one of mobile devices 130, to include the locally assigned IP address, and correspondingly may translate outbound packets, received from one of mobile devices 130 and destined for an external device, to include the public-facing IP address. Under NAT, the number of available IP addresses can be extended as only one IP address needs to be assigned to each local wireless network 120/125. One consequence of NAT, however, is that a device behind a NAT server, such as local router 127, may not be aware of the public-facing IP address of the NAT server.

IP discovery server 140 may assist in the discovery of public-facing IP addresses of mobile devices 130. A mobile device 130, behind a local router 127, may, for instance, send a first message to IP discovery server 140. The first message may have its source IP address translated by local router 127 and the public-facing IP address of local wireless network 120/125, which may then be obtained, from the first message, by IP discovery server 140. IP discovery server 140 may respond to the first message, to the mobile device 130, with a second message, that may include the public-facing IP address that was obtained from the first message. In this manner, IP discovery server 140 may assist a mobile device 130, which may be behind a NAT device (e.g., a local router 127), to obtain the public-facing IP address of local router 127.

Authentication server 150 may include one or more devices to perform authentication services for users of mobile devices 130. In one implementation, users of mobile devices 130 may be subscribed to an account, such as an account with a telecommunication or content provider. Authentication server 150 may authenticate the user and/or the mobile device 130 of the user, as being the user that is subscribed to the account.

License/key server 160 may include one or more devices to store encryption/decryption keys associated with content that may be provided by content delivery server 170. License/key server 160 may receive requests for a license for a particular content item stored at content delivery server 170. License/key server 160 may validate, such as by making a request to application server 180, that the particular mobile device 130, and the user of the mobile device, are authenticated and entitled to view the requested content. When the mobile device and user are authenticated and entitled to view the requested content, license/key server 160 may transmit an appropriate license to mobile device 130. The license may include one or more decryption keys that may be used in decrypting the requested content.

Content delivery server 170 may include one or more devices that store and deliver content to mobile devices 130. Content delivery server 170 may, for example, store a number of content items that can be delivered, via unicast or multicast transmission, to mobile devices 130. The content items may include, for example, movies on demand or other video on demand content, streaming channels (e.g., television channels), downloadable or live streaming audio programs, etc. Content delivery server 170 may deliver the stored content items as on-demand streaming content. For broadcast streaming content, such as television content, content delivery server 170 may store the content and make it available, in real-time or near real-time relative to the original broadcast of the content.

For some video content, such as streaming video content (e.g., a live television broadcast), content may be delivered by content delivery server 170 as chunks of content, such as content divided into 10-15 second chunks. Each chunk may potentially be encrypted with a separate encryption key. For other types of content, such as a downloadable movie, the content may be downloaded as a single file that can be decrypted with a single key.

Application server 180 may include one or more devices to coordinate the authentication, authorization, and/or billing of users that view content. Application server 180 may, for example, communicate with authentication server 150 and license/key server 160 to determine whether a user/mobile device is authenticated and whether a user is entitled to view requested content. Application server 180 may maintain a database, such as database 187, to store the authentication and authorization state of users and/or account information of the users. Database 187 may include, for example, a relational database or another type of database.

Application server 180 may additionally provide information, such as a catalog of available content, to mobile devices 130. The catalog of available content may be obtained from catalog server 185. Catalog server 185 may include one or more devices that may be updated to reflect the current catalog of content available at content delivery server 170. Catalog server 185 may provide the current catalog to requesting devices, such as application server 180.

In addition to storing a catalog of the available video content, catalog server 185 may store other information, such as index information that provides additional information relating to the content, such as links to a key file needed to decrypt the content or a description of the content.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more tasks described as being performed by one or more other components of environment 100.

Figure 2:
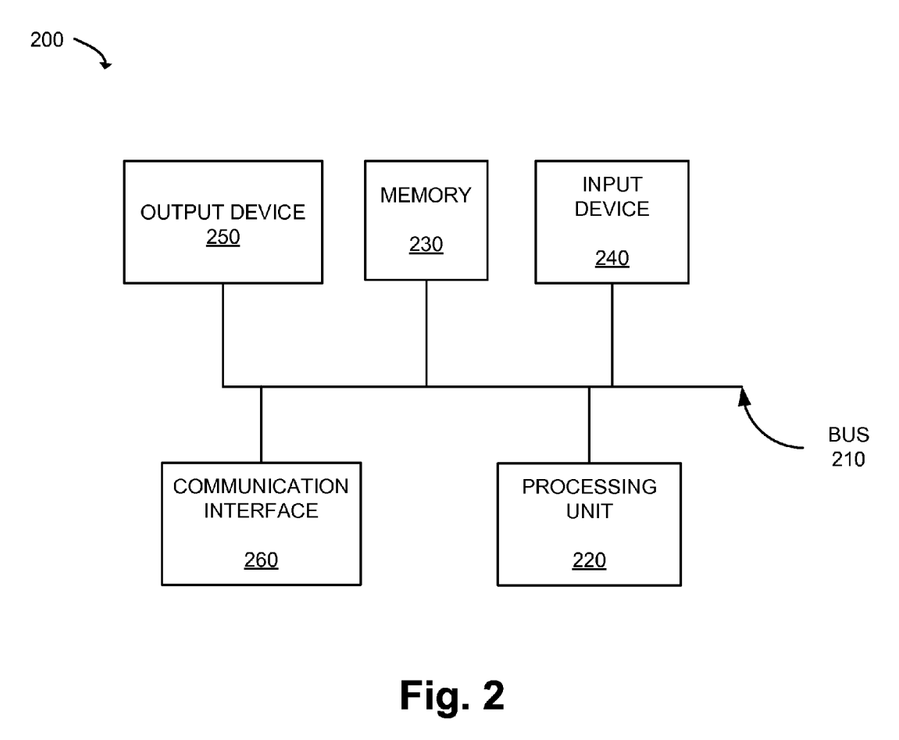
FIG. 2 is a diagram of example components of a device that may correspond to one of the devices of the environment shown in FIG. 1.

FIG. 2 is a diagram of example components of a device 200 that may correspond to one of the devices of environment 100. Device 200 may be included in, for example, mobile devices 130, IP discovery server 140, authentication server 150, license/key server 160, content delivery server 170, application server 180, catalog server 185, and/or database 187. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a non-transitory memory device. A memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3A:
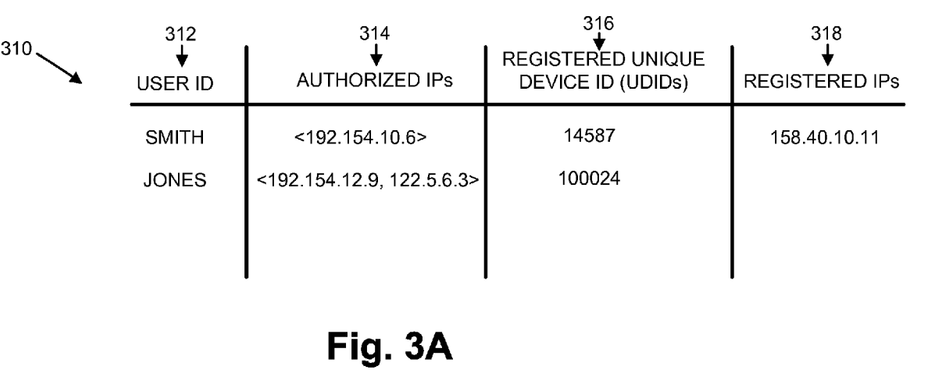
FIGS. 3A and 3B are diagrams illustrating example data structures that may be stored and/or maintained by one or more of the servers shown in the environment of FIG. 1.
Figure 3B:
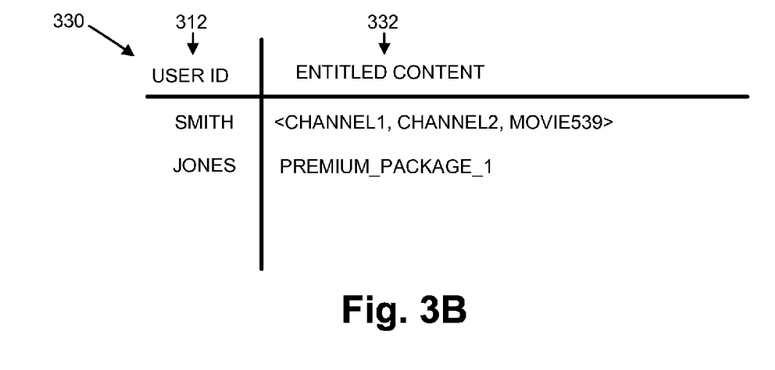

FIGS. 3A and 3B are diagrams illustrating example data structures that may be stored and/or maintained by one or more of the servers shown in environment 100. In one implementation, the data structures shown in FIGS. 3A and 3B may be maintained by application server 180, such as by storing the data structures in database 187.

FIG. 3A illustrates an example data structure 310 that may store information relating to user accounts and IP addresses authorized for the user accounts. Data structure 310 may include a user ID field 312, an authorized IP field 314, a registered unique device ID (UDID) field 316, and a registered IP field 318. User ID field 312 may include an identifier that identifies the account of a particular user, such as an account with a telecommunication provider and/or content provider. In one implementation, only users with established accounts may receive content from content delivery server 170.

Authorized IP field 314 may include one or more IP addresses that are authorized IP addresses for the user. An IP address may include, for example, an IP address that is known to be an IP address that is approved to be used with the reception of at least some of the content available at content delivery server 170. For example, a local wireless network 120 may be associated with a customer's premises, that receives telecommunications services, such as through a fiber optic network provided by a telecommunications provider. The telecommunications services may include traditional television broadcast services and broadband data services. Local router 127 may be assigned a public-facing IP address by the telecommunications provider. The assigned IP address, which may be associated with the known physical location (i.e., the customer's premises), may be an authorized IP address for the customer. Other IP addresses, such as IP addresses associated with public WiFi access points, which have been approved for use in delivery of certain content and/or to certain users, may also be included in authorized IP field 314.

Registered UDID field 316 may include identifiers of one or more mobile devices 130 associated with the account identified in user ID Field 312. Mobile devices 130 may include unique identifiers that are associated with the hardware of mobile devices 130. This unique identifier may be stored in registered UDID field 316 when a user first installs software, such as a content playback application, for playing content items on mobile device 130. Alternatively, when mobile device 130 is not inherently associated with a unique identifier, the content playback application may generate a unique identifier, based on hardware properties of mobile device 130, when the playback application is initially installed or registered. This unique identifier may be stored in registered UDID field 316.

Registered IP field 318 may store the public-facing IP addresses that are registered by mobile devices 130 associated with each user account. As part of an initial authentication process, and as will be described in more detail below, mobile device 130 may transmit its public-facing IP address to authentication server 150 and/or application server 180. These IP addresses may be stored in registered IP field 318.

The combination of a UDID for a mobile device 130 and the registered IP of mobile device 130 may serve as a unique key or token that may be used for subsequent verification of mobile device 130.

Two example entries are given for data structure 310. In the first entry, the user "SMITH" is illustrated as being associated with one authorized IP address (i.e., the IP address 192.154.10.6), one registered device (i.e., the device with the unique ID 14587), and one registered IP address (158.40.10.11). In the second entry, the user "JONES" is illustrated as being associated with two authorized IP address (i.e., the IP addresses 192.154.12.90 and 122.5.6.3) and one registered device (i.e., the device with the unique ID 100024).

FIG. 3B illustrates an example data structure 330 that may store information relating to the content to which a user is entitled. For example, a user may pay for a number of television channels and may be entitled to stream these television channels to registered mobile devices 130. As another example, the user may rent or purchase a movie or other content item, which may entitle the user to download these content items to a registered mobile device 130. Data structure 330 may include user ID field 312 and an entitled content field 332. User ID field 312 may include the features discussed with respect to data structure 310. Entitled content field 332 may include information to identify content items to which the user is entitled to receive on a registered mobile device 130. In one implementation, entitled content field 332 may include a reference, such as a content item identifier, for each content item that the user is entitled to receive. Alternatively or additionally, policy rules may be included, in entitled content field 332, that can be used to determine if a particular content item is entitled to be received on a registered mobile device 130. For example, certain content items may be viewable by certain classes of users, on certain dates (e.g., after a specified date), or based on other rules.

Two example entries are given for data structure 330. In the first entry, the user "SMITH" is illustrated as being entitled to view the content labeled as "CHANNEL1," "CHANNEL2," and "MOVIE539". In the second entry, the user "JONES" is illustrated as being entitled to view the content "PREMIUM_PACKAGE_1."

FIGS. 3A and 3B illustrate example fields that may be included in data structures that may be maintained by application server 180. Alternatively, additional fields, fewer fields, or different fields may be maintained.

Figure 4:
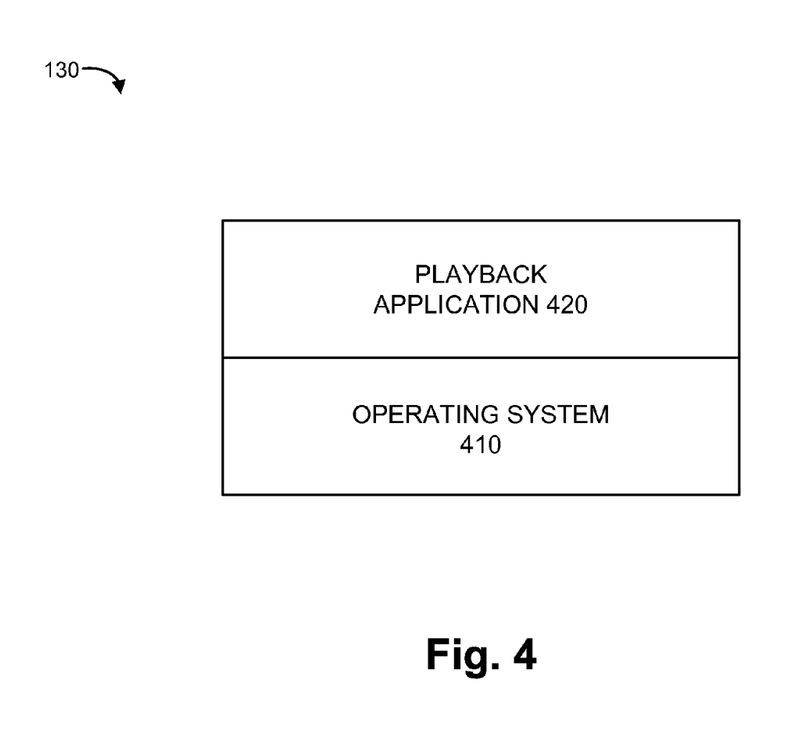
FIG. 4 is a diagram illustrating an example of conceptual components that may be implemented at a mobile device.

FIG. 4 is a diagram illustrating an example of conceptual components that may be implemented at mobile device 130. The components shown in FIG. 4 may include software components, such as programs implemented by programming instructions. As shown, mobile device 130 may include an operating system 410 and a playback application 420. Operating system 410 may include one or more programs or processes that manages the hardware resources of mobile device 130 and provides common services for application software. The application software may include applications (apps) that are installed at mobile device 130. One application is particularly illustrated as playback application 420. Playback application 420 may be an application designed to retrieve content from content delivery server 170 and play the content to the user. As previously mentioned, the content may be retrieved as streaming content that may be immediately provided to the user or as downloadable content that may be saved and provided to the user at a later time. The operation of playback application 420 will be described in more detail below.

Although FIG. 4 shows example components of mobile device 130, in other implementations, mobile device 130 may contain fewer components, different components, differently arranged components, or additional components than depicted in FIG. 4. Alternatively, or additionally, one or more components of mobile device 130 may perform one or more other tasks described as being performed by one or more components of mobile device 130.

Figure 5:
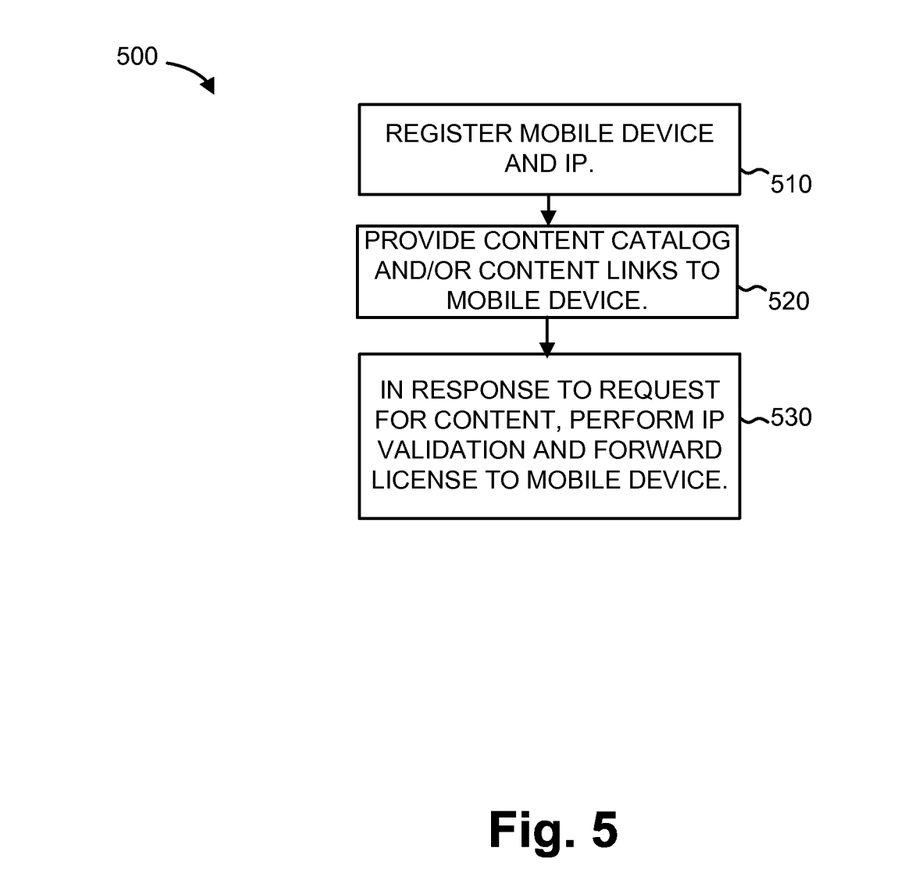
FIG. 5 is a flow chart illustrating an example process for Internet protocol (IP) address-based mobile device authentication and content delivery.

FIG. 5 is a flow chart illustrating an example process 500 for IP address-based mobile device authentication and content delivery. Process 500 may be performed by a number of the devices shown in environment 100, such as a combination of mobile device 130, IP discovery server 140, authentication server 150, license/key server 160, content delivery server 170, and application server 180.

Process 500 may include registering mobile device 130 and the IP address, such as the public-facing IP address, of mobile device 130 (block 510). Registering mobile device 130, as will be described in more detail below, may include obtaining the public-facing IP address of mobile device 130 from IP discovery server 140, and transmitting the public-facing IP address, along with other information, to authentication server 150. The other information may include, for instance, a user ID and the UDID of the mobile device 130. In some implementations, other information, such as a user password may also be received from mobile device 130.

Process 500 may further include providing a content catalog and/or content and links to mobile device 130 (block 520). Mobile device 130 may request a content catalog, such as a list of available content items at content delivery server 170. Application server 180, or another server, may provide the content catalog to mobile device 130. Each item in the content catalog may be associated with one or more links, such as uniform resource locators (URLs), that describe from where to download the underlying content. The links may point to, for example, files at content delivery server 170. Playback application 420 of mobile device 130 may use the links to request content from content delivery server 170. The content may be delivered as, for example, encrypted chunks that may define all or a portion of a content item.

At some point, the user of mobile device 130 may choose to begin receiving content from content delivery server 170. In response to a request for content, process 500 may further include validating the IP address and forwarding a license to mobile device 130 (block 530). Validating the IP address may include determining if the requested content can be viewed using the registered IP address. Other validation operations may be performed. For instance, block 530 may include determining whether the user's account is entitled to view the requested content. When the validation is successful, a license may be transmitted to mobile device 130. The license key may include one or more decryption keys that may be used to decrypt the encrypted chunks corresponding to the requested content. Playback application 420 may use the decryption keys, from the license, to decrypt and playback the content.

Figure 6:
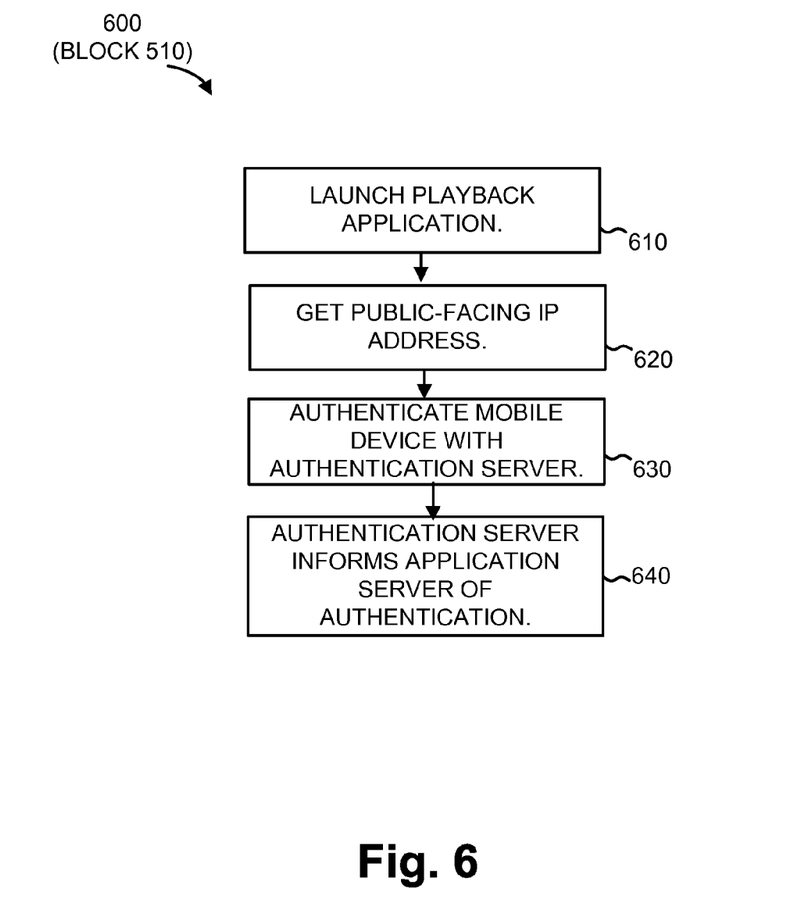
FIG. 6 is a flow chart illustrating an example process for registering a mobile device and a public-facing IP address of mobile device.

FIG. 6 is a flow chart illustrating an example process 600 for registering mobile device 130 and the public-facing IP address of mobile device 130. Process 600 may correspond to the operations performed in block 510 (FIG. 5).

Process 600 may include launching playback application 420 (block 610). As previously mentioned, playback application 420 may be launched from mobile device 130. Mobile device 130 may include connectivity to an external network, such as an IP packet based network, through a local access point, such as local router 127.

Process 600 may include obtaining the public-facing IP address of mobile device 130 (block 620). Obtaining the public-facing IP address of mobile device 130 may include transmitting a message, by mobile device 130, to IP discovery server 140. As was previously discussed, IP discovery server 140 may respond to mobile device 130 by transmitting a second message, back to mobile device 130, that includes the public-facing IP address of mobile device 130. IP discovery server 140, because it is on the public side of any NAT functions performed by local router 127, may have access to the public-facing IP address.

Process 600 may further include authenticating mobile device 130 with authentication server 150 (block 630). For example, playback application 420, of mobile device 130, may send an authorization request to authentication server 150. The authorization request may include the public-facing IP address of local router 127 (as was determined in block 620). In some implementations, the authentication request may also include the UDID of mobile device 130, user ID, and/or a password. Authentication server 150 may authenticate, based on the information in the authorization request, mobile device 130. For example, authentication server 150 may confirm that the user ID and password correspond to the account of the user. In some implementations, authentication server 150 may additionally verify, as part of the authentication, that the received UDID matches a device ID that was previously registered for mobile device 130.

Authentication server 150 may inform application server 180 of the result of the authentication (block 640). Authentication server 150 may thus register the authentication with application server 180, which may store an indication of the registration, such as by updating data structure 310 to include the UDID of mobile device 130 and the public-facing IP address as an address in registered IPs field 318.

In one implementation, blocks 620-640 may be repeated periodically or whenever the local IP address of mobile device 130 changes.

Figure 7:
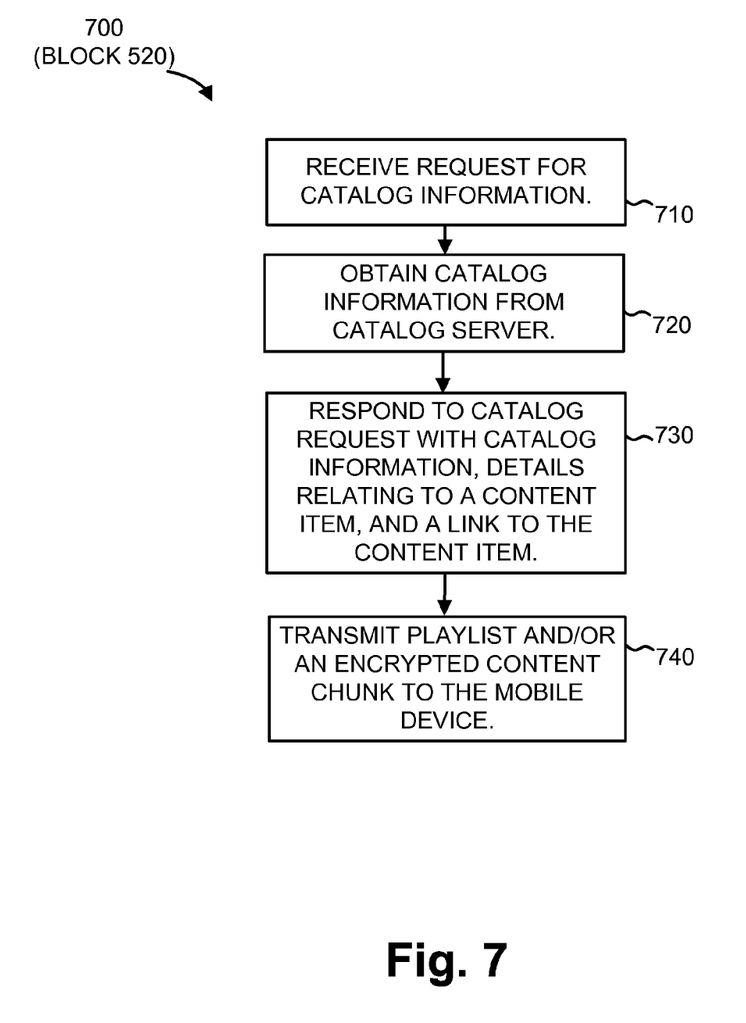
FIG. 7 is a flow chart illustrating an example process for providing catalog and/or content links to a mobile device.

FIG. 7 is a flow chart illustrating an example process 700 for providing catalog and/or content links to mobile device 130. Process 700 may correspond to the operations performed in block 520 (FIG. 5).

Process 700 may include receiving a request for catalog information (block 710). A user may wish to view available content on mobile device 130. Playback application 420 may request the available content from, for example, application server 180. In response to this request, application server 180 may retrieve the available content from catalog server 185 and may forward the catalog information to mobile device 130 (block 730). The available content may be forwarded as, for example, a list of content. Each content item in the list may include details relating to the content item (block 730), such as a broadcast date of the content item, a description of the content item, and one or more representative images for the content item. Each content item in the catalog may additionally be associated with a link, such as a uniform resource locator (URL), to use when requesting the content item from content delivery server 170 (block 730).

A user may browse the catalog information through playback application 420. At some point, the user may choose to view and/or begin downloading one of the content items. Mobile device 130 may use the link for the content item to initiate viewing/downloading of the selected content item from content delivery server 170.

In response to playback application 420 initiating viewing/downloading of a content item, process 700 may further include transmitting a playlist and/or an encrypted content chunk to mobile device 130 (block 740). As mentioned, a content item may be stored, by content delivery server 170, as a number of sections, called chunks. For example, live television broadcasts may be stored in 15 second chunks. The playlist may include a list of the chunks that define the content item. Mobile device 130 may thus use the playlist to determine which chunks, and the order of the chunks, to download, from content delivery server 170 and for a particular content item. The chunks may each be encrypted.

Figure 8:
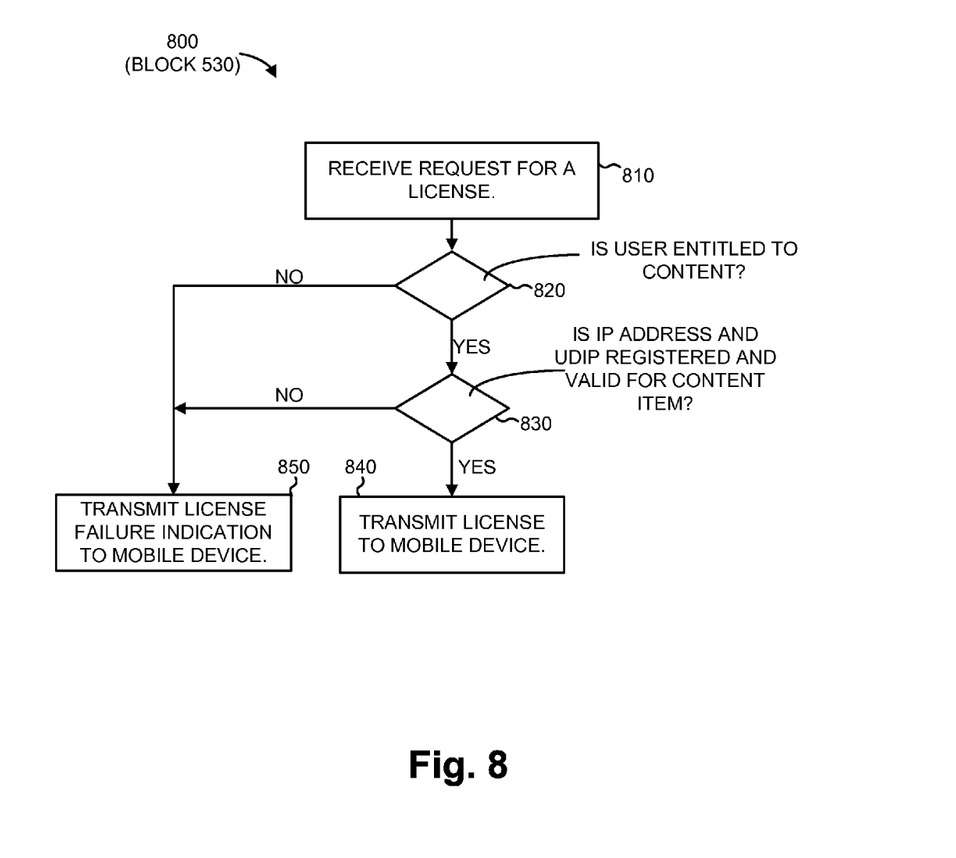
FIG. 8 is a flow chart illustrating an example process for providing licenses, for content items, to a mobile device.

FIG. 8 is a flow chart illustrating an example process 800 for providing licenses, for content items, to mobile devices 130. Process 800 may correspond to the operations performed in block 530 (FIG. 5).

Process 800 may include receiving a request for a license, for a content item, from mobile device 130 (block 810). A license for a content item may include one or more decryption keys that may be used in decrypting the content chunks received from content delivery server 170. The request for the license may be received by license/key server 160. The request may include, for example, the user ID, the UDID, the public-facing IP address obtained by mobile device 130 from IP discovery server 140, and/or an identification of the content item for which the license is requested. The request for the license may be transmitted to playback application 420 of mobile device 130.

Process 800 may include determining whether the user, corresponding to the request for the license, is entitled to receive the requested content item (block 820). In one implementation, license/key server 160 may request that application server 180 make this determination. Application server 180 may, for example, query data structure 330, in database 187, to determine whether the account associated with the user ID and/or the UDID is entitled to the requested content item. Some content, for example, may be available to all registered users. Other content, however, may only be available to certain users, such as users that are subscribed to a premium package. As another example, for pay-per-view content, application server 180 may determine whether the user has paid for the requested content item.

When the user is determined to be entitled to the requested content, (block 820—YES), application server 180 may determine whether the public-facing IP address, from the license request, along with the UDID of mobile device 130, is registered and is valid for the particular content item (block 830). In one implementation, the combination of the IP and the UDID of mobile device 130 may function as a key or token that is used to access data structure 310. Application server 180 may, for example, query data structures 310 and 330, in database 187, to determine whether the received IP address/UDID matches fields 316/318, and whether the received IP address is authorized for the content item. For certain content items, such as those with location restrictions or other restrictions, only certain IP addresses may be authorized to receive the content items. For example, in one implementation, for television broadcasts, only IP addresses associated with local routers 127, that are assigned by a particular telecommunication provider, may be authorized for the television broadcasts.

When the user is entitled to the requested content item, (block 820—YES), and the IP address is registered and valid for the content (block 830—YES), a license for the requested content, including one or more decryption keys, may be transmitted back to mobile device 130 (block 840). For example, application server 180 may return a license "success" indication back to license/key server 160, which, in response, may transmit the license to mobile device 130. When the user is not entitled to the requested content item, (block 820—NO), or the IP address is not registered or valid for the content (block 830—NO), an indication that that license request was a failure may be transmitted to mobile device 130 (block 850). For example, application server 180 may return a license "failure" indication back to license/key server 160, which, in response, may forward the failure indication back to mobile device 130.

When a license is successfully returned to mobile device 130, playback application 420, of mobile device 130, may decrypt and present the received chunks of the requested content items to the user. For streaming content, such as live television broadcasts, a new license may be periodically requested (such as every 15 seconds) to decrypt new content chunks. For downloaded content, however, such as a video-on-demand movie, a single license and a corresponding decryption key may be used for the entire content item. In this situation, the user may have the option of watching the content item offline (i.e., when mobile device 130 is not connected to a network).

Figure 9:
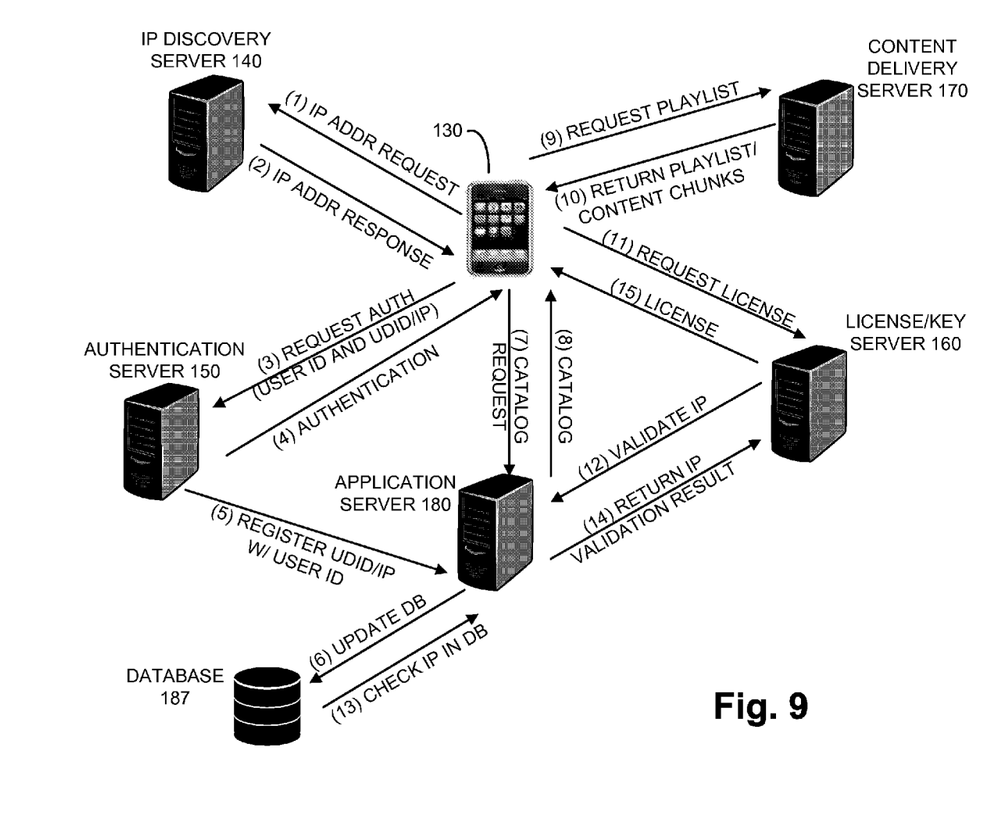
FIG. 9 is a signal flow diagram illustrating an example of communications between components in the environment of FIG. 1.

FIG. 9 is a signal flow diagram illustrating an example of communications between components in environment 100, such as a signal flow that may be consistent with the operations shown in FIGS. 5-8.

Playback application 420, of mobile device 130, may begin a registration process by obtaining its public-facing IP address. The public-facing IP address may be obtained by sending a request, such as a message, to IP discovery server 140 (communication [1]). IP discovery server 140 may respond with a message including the public-facing IP address of mobile device 130 (communication [2]). Mobile device 130 may then request authentication with authentication server 150 (communication [3]). The request may include a user ID, the UDID of mobile device 130, a user password, and the public-facing IP address of mobile device 130. When the user password and user ID match, authentication server 150 may confirm the authentication with mobile device 130 (communication [4]) and register the authentication with application server 180 (communication [5]). In particular, the UDID/IP address pair may be registered in data structure 310 (communication [6]).

A user of mobile device 130 may request, through playback application 420, a catalog of available content (communication [7]). In some implementations, the catalog of available content may be continuously updated or downloaded as new content becomes available. Application server 180 may respond with the catalog (communication [8]).

At some point, the user of mobile device 130 may choose a particular content item to download or stream. Mobile device 130 may issue a request to content delivery server 170 for the playlist corresponding to the particular content item (communication [9]). Content delivery server 170 may respond with a playlist that includes references to encrypted content chunks for the particular content item and/or the substantive content chunks (communication [10]).

Mobile device 130 may also request a license for the content (communication [11]). For some content, such as content that is not encrypted, a license may not be required. The license request may include a message that includes the user ID, the UDID of mobile device 130, and the public-facing IP address of mobile device 130. The public-facing IP passed by device 130 can be further validated by license/key server 160 from the HTTP request header of device 130 by identifying the device IP of device 130. In another possible approach, device 130 may not be required to pass any IP information at all. Instead, the public IP of device 130 can be obtained from the request HTTP header. This IP address can be used to pair with the UUID obtained from device 130 for validation. License/key server 160 may request that application server 180 validate the license request (communication [12]). Application server 180 may perform a look up into database 187 to ensure that the UDID/IP pair is included in database 187 and that the user is entitled to view the particular content item (communication [13]). Application server 180 may return a result of the validation to license/key server 160 (communication [14]). If the result and the validation is successful, license/key server 160 may return a license to mobile device 130 (communication [15]). The license may include decryption keys needed to decrypt the content chunks from content delivery server 170.

Systems and/or methods described herein may determine whether a subscriber is entitled to view video content delivered over an IP based network. The determination may be made based on a public-facing IP address of the subscriber.

The foregoing description of implementations provides illustration and description, but is not intended to be exhaustive or to limit the implementations to the precise form disclosed. Modifications and variations are possible in light of the above teachings or may be acquired from practice of the implementations.

For example, while a series of blocks has been described with regard to FIGS. 5-8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification. Although each dependent claim listed below may directly depend on only one other claim, the disclosed implementations include each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more computing devices, the method comprising:
    receiving, by the one or more computing devices and from a mobile device, a first request, to determine a public-facing Internet Protocol (IP) address of the mobile device;
    transmitting, by the one or more computing devices, in response to the first request, and to the mobile device, the public-facing IP address of the mobile device;
    receiving, by the one or more computing devices, a second request, from the mobile device, to authenticate the mobile device to receive downloadable content, the second request including a user identifier (ID) of the user of the mobile device, the public-facing IP address of the mobile device, and a unique device identifier (UDID) of the mobile device;
    receiving, by the one or more computing devices, a third request, from the mobile device, for a license to receive a particular content item;
    determining, by the one or more computing devices, whether the license to receive the particular content item should be issued, the determining being based on:
        whether the public-facing IP address is assigned to an approved network access point, the approved network access point being different from the mobile device, and
        whether the UDID of the mobile device was previously registered for the mobile device; and
    transmitting, by the one or more computing devices, the license to the mobile device, where the license includes one or more decryption keys for the particular content item.

2. The method of claim 1, where the downloadable content includes streaming video content.

3. The method of claim 1, further including:
    extracting, by the one or more computing devices, the public-facing IP address from the first request.

4. The method of claim 1, further comprising:
    receiving, from the mobile device, a fourth request, for a catalog of available content; and
    transmitting, to the mobile device and in response to the fourth request, information relating to downloadable content that is available.

5. The method of claim 4, where the information relating to the downloadable content includes links to the downloadable content.

6. The method of claim 1, wherein the network access point includes a WiFi access point implemented by a local wireless router associated with a customer premises or a public WiFi access point.

7. The method of claim 1, further including:
determining whether to transmit the license to the mobile device based additionally on subscription information relating to an account of the user of the mobile device.

8. The method of claim 1, where the mobile device includes a tablet computer, a smart phone, or a laptop computer.

9. A non-transitory computer-readable medium comprising:
one or more instructions that, when executed by one or more processors of a device, cause the one or more processors to:
receive, from a mobile device, a first request, to determine a public-facing Internet Protocol (IP) address of the mobile device;
transmit, in response to the first request and to the mobile device, the public-facing IP address of the mobile device;
receive a second request, from the mobile device, to authenticate the mobile device to receive downloadable content, the second request including a user identifier (ID) of the user of the mobile device, the public-facing IP address of the mobile device and a unique device identifier (UDID) of the mobile device;
receive a third request, from the mobile device, for a license to receive a particular content item;
determine whether the license to receive the particular content item should be issued, the determining being based on:
whether the public-facing IP address is assigned to an approved network access point, the approved network access point being different from the mobile device, and
whether the UDID of the mobile device was previously registered for the mobile device; and
transmit the license to the mobile device, where the license includes one or more decryption keys for the particular content item.

10. The non-transitory computer-readable medium of claim 9, where the video content includes streaming video content.

11. The non-transitory computer-readable medium of claim 9, further including:
one or more instructions, which when executed by the one or more processors, cause the one or more processors to:
extract the public-facing IP address from the first request.

12. The non-transitory computer-readable medium of claim 9, further comprising:
one or more instructions, which when executed by the one or more processors, cause the one or more processors to:
receive, from the mobile device, a fourth request, for a catalog of available content; and
transmit, to the mobile device and in response to the fourth request, information relating to downloadable content that is available.

13. The non-transitory computer-readable medium of claim 12, where the information relating to the downloadable content includes links to the downloadable content.

14. The non-transitory computer-readable medium of claim 9, wherein the network access point includes a WiFi access point implemented by a local wireless router associated with a customer premises or a public WiFi access point.

15. The non-transitory computer-readable medium of claim 9, further including:
one or more instructions, which when executed by the one or more processors, cause the one or more processors to:
determine whether to transmit the license to the mobile device based additionally on subscription information relating to an account of the user of the mobile device.

16. The non-transitory computer-readable medium of claim 9, where the mobile device includes a tablet computer, a smart phone, or a laptop computer.

17. A method, implemented by a mobile device, comprising:
transmitting, by the mobile device, a message to an Internet Protocol (IP) discovery server;
receiving, by the mobile device, in response to the message, a public-facing IP address of the mobile device;
transmitting, by the mobile device, a second message to an authentication sever, to authenticate the mobile device for downloading of video content, where the second message includes a user identifier (ID) of the user of the mobile device, a unique device identifier (UDID) associated with the mobile device, and the public-facing IP address of the mobile device;
transmitting, by the mobile device, a request for a license for a particular video content item, the request including the public-facing IP address of the mobile device, where the license is granted or denied based on the validity of the public-facing IP address for the particular video content and based on the UDID associated with the mobile device, the validity of the public-facing IP address being based on whether the public-facing IP address is assigned to an approved network access point, the approved network access point being different than the mobile device;
receiving, by the mobile device, a license for the particular video content; and
playing, by the mobile device, the particular video content, by decrypting chunks of data, corresponding to the video content, using one or decryption keys obtained from the license.

18. The method of claim 17, further comprising:
requesting the particular video content from a content delivery server; and
receiving the particular video content from the content delivery server.

19. The method of claim 18, where receiving the particular video content from the content delivery server includes:
receiving a playlist describing chunks of data that make up the particular video content.

20. The method of claim 17, further comprising:
transmitting a request for a catalog of available video content; and
receiving, in response to the request, information describing the available video content.

21. The method of claim 19, where the information describing the available video content includes links to the available video content.

22. The method of claim 17, where the mobile device includes a tablet computer, a smart phone, or a laptop computer.

* * * * *